US005258131A

United States Patent [19]

Mirick et al.

[11] Patent Number: 5,258,131

[45] Date of Patent: Nov. 2, 1993

[54] PRODUCTS FOR TREATING ASBESTOS

[75] Inventors: William Mirick, Worthington, Ohio; Walter B. Forrister, Midland, Mich.

[73] Assignee: Austen-Chase Industries Inc., New York, N.Y.

[21] Appl. No.: 862,334

[22] Filed: Apr. 2, 1992

Related U.S. Application Data

[63] Continuation-in-part of Ser. No. 509,571, Apr. 13, 1990, abandoned.

[51] Int. Cl.[5] ........................ A63D 3/00; C09K 13/00; C09K 13/08; C01F 1/00

[52] U.S. Cl. .................................. 252/79.1; 252/79.3; 588/254; 588/901; 423/167.1; 423/335; 423/659

[58] Field of Search ............... 252/79.3; 588/254, 901; 423/155, 167, 331, 335, 336, 659, DIG. 20, 167.1, 79.1

[56] References Cited

U.S. PATENT DOCUMENTS

| | | | |
|---|---|---|---|
| 112,650 | 3/1871 | Stevens | 423/167 |
| 1,094,505 | 4/1914 | Whitney | 423/167 |
| 3,297,516 | 1/1967 | Naumann et al. | 423/167 |
| 3,551,228 | 12/1970 | Meth | 252/79.3 |
| 3,867,218 | 2/1975 | Henry | 252/79.3 |
| 3,965,284 | 6/1976 | Xanthos et al. | 427/221 |
| 4,055,458 | 10/1977 | Niederprüm | 252/79.3 |
| 4,181,623 | 1/1980 | Dillarstone et al. | 252/79.3 |
| 4,347,150 | 8/1982 | Arpin | 252/174.3 |
| 4,376,673 | 3/1983 | Cheung | 252/79.3 |
| 4,395,304 | 7/1983 | Kern et al. | 252/79.3 |
| 4,401,636 | 8/1983 | Flowers | 423/327 |
| 4,474,742 | 10/1984 | Graceffa et al. | 423/331 |
| 4,555,304 | 11/1985 | Sälzle | 252/79.3 |
| 4,582,624 | 4/1986 | Enjo et al. | 252/79.3 |
| 4,693,755 | 9/1987 | Erzinger | 106/169 |
| 4,812,204 | 3/1989 | Delvaux et al. | 423/167 |
| 4,921,572 | 5/1990 | Roche | 252/79.3 |
| 5,041,277 | 8/1991 | Mirick | 423/659 |
| 5,091,053 | 2/1992 | Blonder et al. | 252/79.3 |

FOREIGN PATENT DOCUMENTS

| | | |
|---|---|---|
| 0372084 | 6/1990 | European Pat. Off. . |
| 181504 | 2/1907 | Fed. Rep. of Germany . |
| WO8910338 | 11/1989 | Japan . |
| 356191 | 10/1931 | United Kingdom . |
| 2015979 | 8/1979 | United Kingdom . |

OTHER PUBLICATIONS

"An environmentally acceptable treatment method for chrysotile asbestos wastes", G. Baldwin et al., Chemical Abstracts, vol. 109, No. 20, Nov. 14, 1988, p. 335.

"The destruction of chrysotile asbestos using waste acids", L. Heasman et al., Chemical Abstracts, vol. 105, No. 6 Aug. 11, 1986.

Ullman's Encyclopedia of Industrial Cheistry, 5th Edition, VCH Verlagsgesellschaft mbH, Weinehim, 1985, pp. 151-167.

"Asbestos", vol. 1, Michaels & Chissick (1979), pp. 82-86.

*Primary Examiner*—Gary P. Straub

*Attorney, Agent, or Firm*—Weil, Gotshal & Manges

[57] ABSTRACT

Treatment solutions for removing asbestos containing materials from substrates and for converting asbestos-containing materials to a non-asbestos material, which comprises an aqueous solution containing about 1 to 25% by weight of an acid and 1 to 10% by weight of a source of fluoride ions, such as ammonium fluoride. The acid solution hydrolyses the magnesium oxide units in asbestos while the fluoride ions attack the interleaved silica layers in the crystal structure of asbestos, thereby destroying the fibrous nature of the asbestos.

7 Claims, No Drawings

PRODUCTS FOR TREATING ASBESTOS

BACKGROUND OF THE INVENTION

This is a continuation-in-part of application Ser. No. 07/509,571 filed Apr. 13, 1990, now abandoned.

The invention relates to solutions effective for treating asbestos so as to render it harmless.

Asbestos is a commercial term applied to a group of silicate minerals which occur in fibrous form. There are six principal asbestos minerals. Of these six minerals, only one, chrysotile asbestos, belongs to the group classified as serpentine asbestos, that is, minerals characterized by long fibers that are serpentine in shape. The chemical composition of chrysotile asbestos may be represented as: $Mg_3(Si_2O_5)(OH)_4$ or $3MgO.2SiO_2.H_2O$. The crystalline structure of chrysotile asbestos consists of alternating layers of silica and magnesium oxide/hydroxide bound to each other through covalently shared oxygen. These layers are transverse to the fiber axis.

The other varieties of asbestos are silicates of magnesium, iron, calcium, and sodium. These varieties of asbestos belong to the amphibole (straight fiber) group of minerals. About 95% of world production is the chrysotile form of asbestos.

Due to the unique properties of the asbestos minerals, many different kinds of products were developed during the 1940's through the early 1970's that incorporated asbestos fibers for fire resistance, moisture control. and thermal insulation. Many building products, for example, friable thermal insulation, asbestos-cement pipe, asbestos-cement sheet, floor and roof shingles, transite tiles, acoustical plaster, insulation and fire-retardant paper products, and high-temperature insulation, include asbestos fibers. In the overwhelming majority of cases, these products contain the chrysotile form of asbestos.

For a number of years now it has been recognized that many chronic diseases ar associated with the inhalation of airborne asbestos fibers. These diseases include lung cancer, chronic fibrosis of the lung lining, and mesothelioma (a rare but fatal cancer of the lungs). Although not completely understood, it is believed that when an asbestos fiber comes into contact with a living cell. the asbestos fiber irritates the cell lining and leads to its eventual weakening. After such weakening, it is believed the asbestos fiber enters the cell. Once inside the living cell, the asbestos fiber appears to set in motion a collagen synthesis ultimately resulting in chronic fibrosis and a potential for developing carcinoma.

Due to its hazardous nature, there has been a concerted effort by governmental agencies to ban the use and encourage the removal of materials containing asbestos fibers. The U.S. Environmental Protection Agency has set an upper limit of 1% for the allowable asbestos fiber content in building materials. Furthermore, local governmental agencies in many cities, for example, New York City, require the removal of asbestos materials from buildings before they will issue permits for building renovation or demolition. Many safeguards must be employed to prevent inhalation of airborne asbestos fibers by workers and others in the vicinity of the work area. Respirators must be worn by workers handling the asbestos. Any area in a building in which asbestos material is exposed or is being removed must be isolated by partitions from the remainder of the building. Also, the work area must be kept at a negative pressure with respect to the atmosphere to prevent airborne fibers from leaving the area. Needless to say, these measures are both cumbersome and costly. Additionally, disposal of asbestos products removed from the building also remains a problem.

A number of methods have been proposed for rendering asbestos less harmful but without substantially affecting its significant physical and chemical properties. In U.S. Pat. No. 4,401,636 (Flowers) a method is described for treating silicate minerals with an aqueous metal salt solution to form a metal-micelle silicate. The method purports to render the resulting silicate less harmful to living cells while the treated silicate retains most of its asbestos-like properties. However, the method proposed therein is not totally satisfactory since it does not destroy the fibrous nature of the asbestos. According to the method described in U.S. Pat. No. 4,401,636, a metal is added to the crystal structure of the asbestos, thereby forming a metal-micelle which masks the iron-binding sites in the asbestos. According to that patent, the metal-micelle asbestos, when introduced into a living cell, does not react with cellular iron. Therefore, it is asserted, the reaction that is believed to initiate fibrosis should be blocked and biological hazards associated with exposure of living organisms to asbestos should be reduced.

Accordingly, it is an object of the present invention to provide solutions for rendering asbestos harmless by destroying its crystalline structure and fibrous nature.

It is another object of the present invention to provide solutions suitable for use in in situ processes for destroying asbestos in asbestos containing materials.

It is yet another object of the present invention to provide solutions suitable for use in processes for removing asbestos-containing building materials from buildings and other structures which processes are quicker and less expensive than present methods.

SUMMARY OF THE INVENTION

In accordance with the present invention, there are provided solutions for use in removing asbestos-containing materials from substrates in buildings or other structures, and for treating asbestos-containing materials to convert the asbestos to a non-asbestos, non-hazardous material. The solutions comprise a dilute aqueous acid solution containing a separate source of fluoride ions. The acids are normally preferably weak acids, although strong acids may also be used and, in particular circumstances, may offer advantages.

The term "weak acid" is used herein in its generally understood sense, i.e., an acid is defined as being "weak" if its protolysis reaction with water does not go essentially to completion unless the solution is extremely dilute.

The preferred aqueous solutions of the invention should comprise about 1-25%, preferably about 5-15%, by weight of an organic acid, and about 1-10%, preferably about 2-8%, by weight of the fluoride ion source. The concentration of the acid in the solution is preferably higher than that of the fluoride ion source such that their molar ratio is maintained at greater than one during use. It is believed that a solution according to the invention attacks asbestos in two ways. The acid attacks the MgO layers in the crystal structure of chrysotile asbestos. Simultaneously, the fluoride ions attack the silica layers, converting them into fluorosilicate The fluoride ions in the treatment solution greatly speeds up the rate of conversion of asbestos. It is believed that the fluoride ion increases the rate at which the weak acid diffuses into the magnesia layers. It therefore makes the solution effective in converting forms of asbestos other than chrysotile, such as amosite, which are not attacked very strongly by a weak acid solution alone.

The solution may be used in situ by spraying asbestos-containing materials which are in place, for instance, in a building, one or more times with the solution. Depending on what acid and fluoride ion source is used, one is able to achieve 90% and preferably greater conversion of the asbestos. When 90% or more of asbestos is converted in accordance with the present invention, the remaining material no longer has the characteristic asbestos fibrous nature and so is essentially no longer asbestos.

The treatment of the asbestos-containing material may be performed by immersing asbestos-containing material which has been removed from a substrate, such as, for example, building structural members or pipes, in a solution in accordance with the invention, preferably with agitation of the solution. Most preferably the asbestos containing material is first wet in situ with a solution in accordance with the invention one or more times, for instance, by spraying, and then removed while still wet and soaked in the solution, e.g., by immersion, preferably with agitation, until the conversion is complete. Thereafter, the residue may be neutralized and disposed of as a non-hazardous material.

DETAILED DESCRIPTION OF PREFERRED EMBODIMENTS

The present invention is effective for the conversion of chrysotile or other forms of asbestos, such as amosite. In accordance with the present invention, asbestos is treated, for example by spraying or immersion, with a dilute aqueous solution of a weak acid having a concentration of about 1 to 25%, and preferably 5 to 15%, by weight of the weak acid and about 1 to 10%, preferably about 2 to 8%, by weight of a separate source of fluoride ions. Higher concentrations of weak acid and fluoride ion source may be used but increase expense and materials handling problems, without having been found to provide significant increased benefits. The concentrations of the fluoride ion source is further limited by its solubility. Preferably the weak acid is an organic acid having a pH in the range of about 2 to 6.

Among the organic acids which have been used successfully in accordance with this invention are acetic acid, p-cyanobenzoic acid, trifluoroacetic acid, lactic acid, benzoic acid, and formic acid. Of these, trifluoroacetic, lactic, formic and acetic acids are preferred, with trifluoroacetic acid being most preferred. Acetic acid is substantially slower acting than the others, so that it is less preferred. Weak acids having lower pH's are normally preferred over ones having higher pH's. In principle, any water soluble weak acid may be used, particularly any organic acid. The reaction rates and other characteristics of particular acids may make them undesirable, however. Dilute solutions of organic acids with a source of fluoride ions are preferred because they have been found to wet the asbestos-containing materials extremely well, and obviate the need for any separate wetting agent.

The above weak acids have the following $pK_a$'s:

| Acid | $pK_a$ |
|---|---|
| Acetic | 4.76 |
| Benzoic | 4.21 |
| Lactic | 3.86 |
| Formic | 3.75 |
| p-cyanobenzoic | 3.55 |
| Trifluoroacetic | 0.25 |

Suitable fluoride ion sources include, for example, ammonium fluoride ($NH_4F$), ammonium bifluoride, alkali metal fluorides (LiF, NaF, KF, CsF) and mixtures of the above. The fluoride ion, especially in weak acid solution, is believed to attack the silica layers and greatly enhances the rate at which the weak acid attacks the MgO units in chrysotile asbestos. An important advantage of the preferred treatment solutions of the invention is that they can be handled with only reasonable precautions.

All forms of asbestos are crystalline minerals. The conversion process of the invention converts the asbestos to a noncrystalline material or at least to a material which no longer has more than trace amounts of asbestos crystallinity when measured by currently accepted methods, such as polarizing light microscopy, TEM or X-ray diffraction. Preferably, all traces of asbestos crystallinity are destroyed by the use of the solutions of the invention. When reductions in crystallinity are referred to herein, it is referring to the reduction or substantial elimination of asbestos crystallinity. Similarly, when the solutions and process of the invention are referred to as converting the asbestos-containing material to a non-fibrous material, it refers to the elimination of asbestos fibers. Other types of fibers may remain, particularly if the process is performed completely in situ.

Depending on the weak acid and fluoride ion source that are chosen and their concentration, it is possible to achieve more than 90% reduction of the crystallinity of asbestos by means of the present invention. All that is necessary is to wet the asbestos fibers with the solution, for instance, either by spraying or immersing the asbestos material with or in the solution. In the case of asbestos-containing building materials such as fireproofing materials on girders and decking, this can be done in situ by spraying the solution directly onto the asbestos-containing materials. In the case of such asbestos-containing building materials it is usually necessary to open up the building structures in order to expose the fibers. So long as the solution can penetrate into the asbestos-containing materials so as to wet the fibers, a significant reduction in crystallinity can be achieved and with repeated applications the asbestos is converted to a non-fibrous, non-hazardous material. In order to improve the wetting process, it is desirable in some cases to add a wetting agent to the weak acid and fluoride ion source solution being sprayed on the asbestos-containing material. For example, an anionic surfactant, such as sodium dodecyl sulfate or a non-ionic surfactant such as Surfynol 465, a product sold by the Air Products Company, can be added to the weak acid solution in conventional amounts (e.g., in amounts of about 1% by weight) to increase wetting of the asbestos fibers. Excellent wetting is normally achieved, however, with the application of an organic acid and fluoride ion source solution alone, without an additional wetting agent.

If the asbestos-containing material is to be removed from the building component or other substrate to which it is applied, or if loose asbestos-containing material is to be treated in accordance with the invention, it is normally preferable to immerse the asbestos-containing material in the solution to insure complete wetting. In such case, the solution is preferably agitated, for instance with the use of a propeller-type mixer such as is commonly used in industrial settings, which significantly speeds the conversion of the asbestos. The conversion can be further speeded, if desired, by heating the solution. Heating the solution usually has less effect on the conversion rate in spraying operations because the mass and thermal inertia of the material being treated is normally much greater than that of the solution being applied.

In order to ensure that as much conversion as possible takes place in in situ conversion treatments, the asbestos fibers are preferably subjected to successive sprayings with the solution. Thus, after wetting the asbestos-containing materials a first time with the solution and allowing the hydrolysis reaction to proceed, for instance, for 24 hours, the materials can be wet a second and successive times, preferably with about 12 to 24 hours between each application, until the destruction of the asbestos fibers is achieved. The number of wettings or sprayings required for complete destruction of the asbestos fiber depends on a variety of factors, such as the amount and porosity of the binder with which the asbestos fibers are mixed, the particular weak acid employed, the fluoride ion source included in the solution, and the type of asbestos fibers being treated. It has been found, in accordance with the invention, that the effectiveness of the individual sprayings is substantially increased if the material being treated is permitted to dry between each successive spray application. It is believed that the reason for this is that degradation products produced by the reaction become hydrated and impede transport of fresh treatment solution to the asbestos fibers during subsequent applications. Drying the asbestos-containing material between applications obviates this problem.

If the asbestos-containing material is converted in situ in accordance with the invention, the resulting non-fibrous material may be left in place to perform the fireproofing or other function for which the asbestos was originally installed provided it has retained its physical integrity and adheres adequately to the underlying substrate. In such event, the resulting material is preferably sprayed or washed with a mild alkaline solution, such as of sodium bicarbonate, in order to neutralize any remaining acid in the material. The material is fully neutralized when the pH of a sample is from 6 to 8.

After being neutralized, the material may be stabilized by applying a stabilizing or fixing agent to the material to bind it together. The stabilizing agent should contain a resin-like material, such as a latex resin, as a binder. Desirably, the stabilizing agent also contains a sodium silicate material which helps to bind and harden the material. The stabilizing agent may also include an alkaline neutralizing material, in which case the neutralizing and stabilizing steps may be combined, so that the need for a separate neutralizing step is obviated.

One suitable stabilizing agent comprises about 25% by volume N-sodium silicate, 25% by volume acrylic latex (Rohm and Haas), 5% by volume latex (BF Goodrich), 10% by volume alkaline cleaner (Du Bois), 5% by volume water softener (Calgon), 5% by volume wetting and dispersing additive (Byk), and 25% by volume water. Other stabilizing agents may include styrene-butadiene or polyvinyl chloride resins. Such resins may be used with or without sodium silicate. Yet another stabilizing agent includes a urethane resin and no sodium silicate.

The stabilizing agent is applied, preferably by spraying, after the asbestos-containing material has been treated sufficiently to effectively destroy the fibrous asbestos. Preferably it should be applied while the material is somewhat damp, in two coats applied at a 90° angle with one another. The stabilizing agent typically requires about 4 to 8 hours to cure, depending on the atmospheric humidity. If necessary, for additional fire-retardant characteristics, a layer of non-asbestos-containing fireproofing material can be sprayed over the stabilized material.

While applicants do not wish or intend to be bound by any particular theory or the manner in which the reactions in the method of the invention proceed, it is believed that the MgO layers of chrysotile asbestos attacked by the weak acid are interleaved with silica layers and that the rate of conversion depends, to a great extent, on the rate at which the weak acid diffuses through the silica layers. Applicants have found that the presence of the source of fluoride ions in the treatment solution both dramatically speeds the rate of conversion of the asbestos to a non-fibrous material and makes the process of the invention effective for the conversion of other types of asbestos, such as amosite, to a non-fibrous material. In the case of amosite, it is believed that the treatment solution of the invention converts the asbestos to a noncrystalline product by the fluoride ions attacking the silica content of the asbestos. To do this it is necessary that the fluoride ions be in an acid environment.

For example, in laboratory tests, it has been found that samples of chrysotile asbestos which are not completely converted in 24 hours when immersed in a 10% trifluoroacetic acid solution due to the slow nature of the reaction, are completely dissolved in only 2 hours in an aqueous solution containing 10% trifluoroacetic acid and 5% ammonium fluoride.

It has further been found that the rate of reaction is also significantly increased if the asbestos material immersed in the treating solution is stirred or agitated while the treatment continues.

In accordance with another and often preferred embodiment of the invention, the asbestos-containing material is removed from the substrate to which it has been applied, preferably while still wet from one or more initial spray applications of the treatment solution of the invention, and digested by immersion in the solution, preferably with agitation, until the asbestos is destroyed.

It has been found that about 2 parts to 10 parts by weight of the treatment solution per part of asbestos should be used for the digestion step, with about 5 parts by weight of the acid solution to 1 part of asbestos material normally being adequate to effect conversion in a reasonable amount of time.

The process of the invention, as applied to the abatement of asbestos in buildings and other structures, may typically include the steps of removing any obstructions, such as interior partitions, ceilings and column covers to expose the suspected asbestos-containing materials, sampling and testing the suspected asbestos-containing materials in accordance with applicable standards to determine its composition and other relevant characteristics, determining an optimum formulation for a treatment solution depending on such composition and characteristics, including the need for a separate wetting agent and suitable types and concentrations of weak acids and fluoride ion sources, providing a sufficient amount of such treatment solution, repeatedly spraying the asbestos-containing material in situ with such solution, or removing the asbestos-containing material from the substrate to which it is applied, preferably while it is still wet from an initial spray application of the solution, and immersing the removed material in a container of such treatment solution, in either case until the fibrous nature of the asbestos is effectively destroyed. Thereafter the surfaces that were coated with such asbestos-containing material are refireproofed by either neutralizing and stabilizing the converted material in situ, or by applying a non-asbestos-containing fireproofing material on such surfaces from which the asbestos has been removed. In the latter case a final light spray application or misting of the treatment solution on the surfaces is desirable to convert any remaining asbestos fibers which have been missed by the removal process. For the reasons indicated above it is preferred that the surface be dry before the misting. The surfaces are also preferably neutralized by spraying with mild alkaline solutions. Optionally, an additional layer of fireproofing material can be applied over the stabilized material.

The asbestos abatement process may also be carried out by spraying the asbestos-containing material one or more times with the treatment solution, removing the asbestos-containing material while still wet and disposing of it in a conventional manner. It has been found that the solution of the invention speeds the process of removing the asbestos-containing material from building substrates by as much as 30% to 40% over the time required with other known methods, such as wetting the asbestos containing material with a soap solution. This is an important advantage of the solutions of the present invention and results directly in a substantial reduction in labor cost and building down-time. The underlying substrate can then be misted with the treatment solution (after drying, if desired), neutralized, and then refireproofed as described above.

The particular composition of the solution used for the various spray applications, or for an initial spray application and immersion, may be varied if desired, but are referred to herein collectively as a singular solution. For instance, the concentration of the solution used for the digestion step might preferably be higher than that used for the spray application steps for safety reasons.

The solution used for digesting the asbestos in the asbestos containing material by immersion may be reused a plurality of times, depending upon the amount of asbestos digested. Advantageously, it may also be reconstituted a number of times by adding to it after one of more uses a measured amount of an acid and/or fluoride ion source concentrate in order to restore the concentration of those constituents of the solution to the proper ranges. The amount of acid and fluoride ion source to be added can be determined by measuring the pH and the fluoride ion content of the solution. The solids residue of the converted material is preferably removed from the solution after each digestion operation, for instance, either by decanting the liquid into another container for reuse, or by removing the solids from the container.

If, as contemplated, the digestion step is carried out using containers of a standard size (e.g. a 55 gallon drum), the recharge concentrate is may be supplied in a standard size container, such as a sealed plastic pouch, containing an appropriate amount of the concentrate. This permits the recharging of the digestion solution to be accomplished safely at the job site by relatively unskilled workers with minimum chance of contact with the concentrate. The sealed pouch containing the concentrate may be immersed in the digestion solution and punctured, and so that the concentrate is mixed with the dilute digestion solution. The empty pouch may then be removed from the container and disposed of.

It is expected that, in many instances, only the fluoride ion source will need to be replenished. In such case, a solid fluoride ion source can be used as the concentrate, such as crystalline ammonium bifluoride. Such solid concentrate can advantageously be supplied in a double pouch; an starch based plastic water soluble inner pouch and an insoluble plastic outer pouch of, for example, polyethylene. In such case, the inner pouch could be immersed in the container and allowed to dissolve. Alternatively, the concentrate could be supplied in another type of unbreakable container, such as a plastic jar.

During the removal of asbestos-containing materials, it frequently occurs that substantial amounts of asbestos-containing dust is generated which coat building surfaces such as floors and walls. All traces of this dust must be carefully collected and removed. This is an expensive and time-consuming project because the dust is itself hazardous and must be handled with extreme care. In accordance with the invention, this dust may be dealt with easily and much less expensively by spraying it in situ with the solution of the invention, repeatedly if necessary, in order to convert any asbestos in the dust to a non-fibrous, non-hazardous material. Thereafter the dust may be collected and removed by inexpensive, conventional means, since it no longer contains asbestos.

The initial generation of the dust during the removal of asbestos-containing material from the underlying substrate is preferably minimized in accordance with the invention by wetting the material with the treatment solution of the invention before removal and by keeping such material wet with such solution while it is removed from the substrate.

In cases where the asbestos-containing materials are collected and digested by immersion in a vat containing the treatment solution preferably with stirring or agitation, it is also often desirable to grind up the asbestos-containing material either before or during immersion. This is particularly in the case when the asbestos-containing material is non-porous and not attacked by the treatment solution. Typical examples of such materials are transite board or pipe and asbestos-containing tiles. In such situations it is necessary to grind up the material to enable the treatment solution to contact the asbestos fibers. In accordance with the invention, this grinding is preferably performed while the material is immersed in or being wet down by the treatment solution in order to prevent the generation of asbestos-containing dust. Often, in such situations, a substantial portion of the material dissolves in the treatment solution, thus reducing the volume of material to be disposed of in a landfill site.

In view of the fact that conditions are more controlled during the digestion step than during spraying in situ it is possible, in accordance with the invention to use a dilute solution of a strong acid and fluoride ion source rather than a weak acid for digesting the asbestos-containing material after it has been sprayed in situ with a solution containing a weak acid and removed from the substrate. Examples of suitable acids include hydrochloric, sulfuric and nitric acids. It is preferred to include a fluoride ion source in the solution for the purposes described above. The strong acids have the advantage of being faster acting but have the disadvantage of requiring much more careful handling and a higher potential for causing serious injury or damage if they are mishandled.

After the asbestos in the material has been digested, it is necessary to dispose of the resulting solid and liquid matter in an environmentally safe manner. It is preferred that the solution be neutralized and the fluoride ions be tied up in compounds having low solubility in water. One way of dealing with the fluoride ions is to merely add sand to the used solution to exhaust the fluoride ions and form fluorosilicates upon neutralization having low solubility in water. Neutralization can be accomplished by adding any alkaline species to the used solution. For instance, sodium hydroxide, sodium bicarbonate or calcium hydroxide could be used, with calcium hydroxide having the advantage that it will tend to form calcium fluoride with any remaining fluoride ions, that is very insoluble in water.

In some situations it is desirable for the treatment solution to contain about 20 to 50% by weight of ethanol in order to increase the rate of evaporation. It should be kept in mind, however, that a treatment solution containing fluoride ion should not be allowed to come into contact with any glass surfaces which would be etched by the fluoride ions.

The invention will now be described by reference to the following examples:

EXAMPLE 1

A 5% by weight aqueous solution of trifluoroacetic acid was applied to various different kinds of chrysotile-containing building materials. Different asbestos-containing materials required different reaction times depending on factors such as binder, asbestos fiber length, asbestos fiber content and other fibers present. When thermal insulation, such as used for insulating pipe runs and boilers, was washed a first time with the acid solution, allowed to penetrate for 24 hours, and then washed a second time with the solution, a reduction in crystallinity of 98% or greater was achieved in periods ranging from 2 to 4 days.

EXAMPLE 2

Thermal insulation was washed five times with a 5% solution of acetic acid with a three to four day wait between successive applications. The material did not dry completely between applications. The treatment resulted in a 90% reduction in crystallinity of the chrysotile asbestos. However, the time required for such conversion was approximately 3 to 4 weeks.

EXAMPLE 3

A 1.437 g sample of fairly short fiber chrysotile asbestos in mineral wool (ca. 50% asbestos) was stirred magnetically in 90 ml of an aqueous solution of ten volume percent trifluoroacetic acid and five weight percent ammonium fluoride. The temperature was raised to 55°-60° C. and maintained. After one hour, most of the material had visibly dissolved. A portion was removed and the insoluble matter collected on a 0.2 micron filter. TEM analysis of this residue revealed very few remaining fibers (estimated at less than one percent), most of the material being in the form of particulate matter.

EXAMPLE 4

0.365 g of the chrysotile/mineral wool sample was magnetically stirred in 20 ml of the solution used in Example 3; no heat was applied. The bulk of the material had obviously dissolved after one hour, but the reaction was continued for three hours. A small amount of solid residue was collected on a 0.2 micron filter; TEM analysis showed no fibers remaining.

EXAMPLE 5

0.265 g of the chrysotile/mineral wool sample was magnetically stirred in an aqueous solution of ten volume percent formic acid (a weaker acid than trifluoroacetic) and five weight percent ammonium fluoride. Stirring at room temperature was continued for three hours, at which time undissolved material was collected on a 0.2 micron filter. TEM analysis of the residue showed a low percentage of fibers which appeared under TEM examination not to be asbestos remaining (estimated at ca. 1-2%).

EXAMPLE 6

0.470 g of the chrysotile/mineral wool sample was stirred at room temperature for ten hours in 30 ml of an aqueous solution of ten volume percent acetic acid (a weaker acid than formic acid) and five weight percent ammonium fluoride. TEM analysis of the collected residue showed very low fiber content which appeared under TEM not to be asbestos, as in Examples 3-5.

EXAMPLE 7

0.370 g of the chrysotile/mineral wool sample was stirred at room temperature in 20 ml of an aqueous solution of ten volume percent trifluoroacetic acid and five weight percent sodium fluoride for three hours. TEM analysis of the small amount of collected residue showed only a trace level of fibrous material which appeared not to be asbestos.

EXAMPLE 8

A 0.253 g sample of 7 to 8% chrysotile in a matrix consisting of gypsum and other unidentified components was stirred at room temperature in 15 ml of the solution used in Example 3 for 16 hours, at which time dissolution of the majority of the material was obvious.

EXAMPLE 9

0.300 g of a sample of pure long fiber amosite asbestos was stirred at room temperature for 15 hours in 20 ml of the solution used in Example 3. Most of the material was dissolved; the small amount of remaining insoluble material was not fibrous in nature.

EXAMPLE 10

0.479 g of the chrysotile/mineral wool sample was situated on the raised area of a plastic 4 ounce specimen cup such that any drainage could be removed. The sample was treated dropwise with 3.6 ml of the solution used in Example 3 over a period of three minutes. Approximately 1.5 ml of drainage was removed. The sample was then allowed to dry at ambient temperature. The treatment cycle was then repeated as described a total of ten times, with a minimum of 12 hours between treatments. Since the total amount of residue declined during the treatments, the amount of solution added per cycle was gradually lowered to a final value of 2.0 ml.

After two treatment cycles, the TEM micrographs showed that the appearance of the treated fibers differed from untreated fibers, although many of the fibers continued to exhibit chrysotile asbestos SAED patterns. After six treatments, the appearance of the fibers was significantly altered. None of the fibers exhibited SAED patterns. Further treatments continued to lower the total residue remaining, but some fibrous material was still present at ten treatments.

While the invention has been described by reference to specific embodiments, this was for purposes of illustration only and should not be construed to limit the spirit or the scope of the invention. Those skilled in the art will recognize that numerous alternative embodiments are within the scope of the invention.

We claim:

1. A solution for treating asbestos-containing materials consisting essentially of an aqueous solution comprising 5 to 25% by weight of an organic acid and at least 5% by weight of a source of fluoride ions selected from the group consisting of ammonium and alkali metal fluorides and mixtures thereof.

2. The solution of claim 1 wherein the concentration of such acid is between 5 and 15% by weight.

3. The solution of claim 1 wherein said acid comprises formic acid.

4. The solution of claim 1 wherein said acid is a weak acid having a $pK_a$ of between about 4.76 and 0.25.

5. The solution of claim 1 wherein said acid is selected from the group consisting of acetic acid, trifluoroacetic acid, lactic acid, formic acid, and mixtures and derivatives thereof.

6. The solution of claim 2 wherein said acid comprises trifluoroacetic acid.

7. A solution for facilitating the removal of asbestos-containing material from a surface on which such material is installed consisting essentially of an aqueous solution comprising 1 to 15% by weight of trifluoroacetic acid and about 1 to 10% by weight of a source of fluoride ions selected from the group consisting of ammonium and alkali metal fluorides and mixtures thereof.

* * * * *